L. C. VAN PATTEN.
ROTARY ROD WEEDER.
APPLICATION FILED OCT. 25, 1919.
1,338,200.
Patented Apr. 27, 1920.
2 SHEETS—SHEET 1.
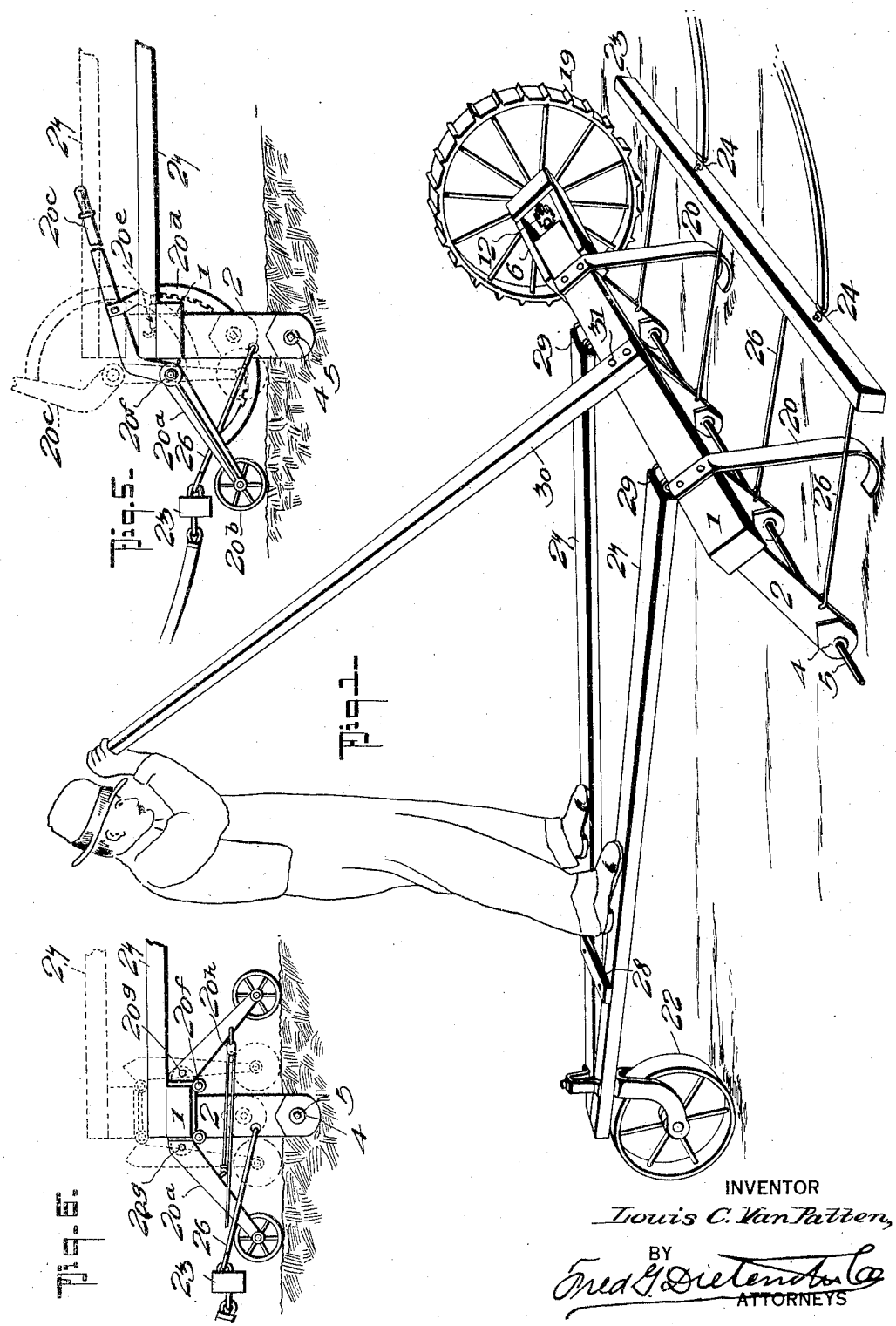
INVENTOR
Louis C. Van Patten,
BY
Fred G. Dieterich Co
ATTORNEYS L. C. VAN PATTEN.
ROTARY ROD WEEDER.
APPLICATION FILED OCT. 25, 1919.
1,338,200.
Patented Apr. 27, 1920.
2 SHEETS—SHEET 2.
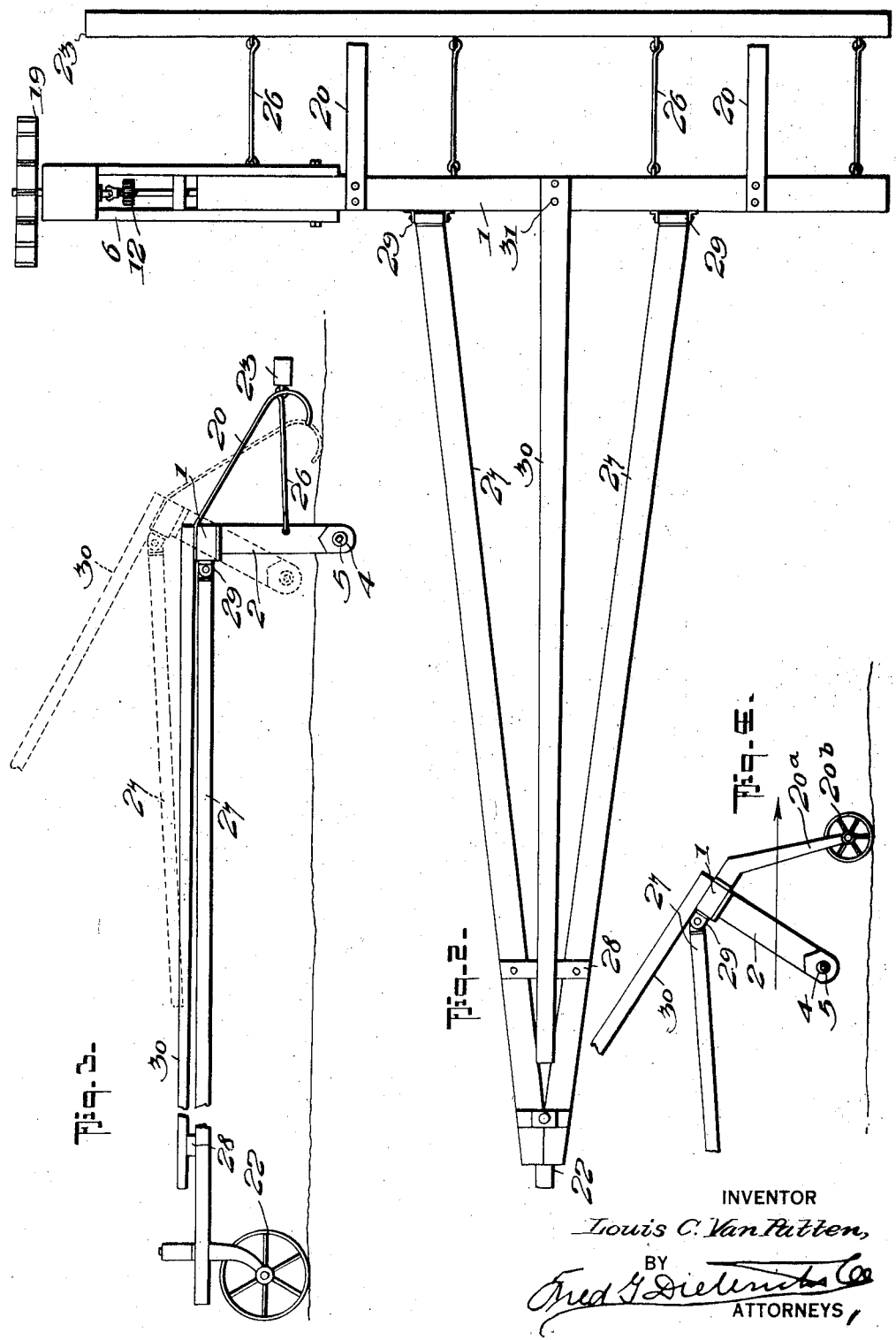
INVENTOR
Louis C. Van Patten,
BY
Fred G. Dieterich Co
ATTORNEYS

UNITED STATES PATENT OFFICE.

LOUIS C. VAN PATTEN, OF CHENEY, WASHINGTON, ASSIGNOR TO ROTARY ROD WEEDER AND MANUFACTURING COMPANY, INCORPORATED, OF CHENEY, WASHINGTON.

ROTARY-ROD WEEDER.

1,338,200.  Specification of Letters Patent.  Patented Apr. 27, 1920.

Application filed October 25, 1919. Serial No. 333,393.

*To all whom it may concern:*

Be it known that I, LOUIS C. VAN PATTEN, a citizen of the United States, residing at Cheney, in the county of Spokane and State of Washington, have invented certain new and useful Improvements in Rotary-Rod Weeders, of which the following is a specification.

My invention relates to the art of agricultural machinery and especially to machines which are adapted to be used for the purpose of destroying weeds and undergrowth, so as to leave the soil in a better condition for planting. The present invention, in the specific embodiment illustrated, is an improvement on the invention disclosed in United States Letters Patent No. 1,232,149, issued July 3, 1917, and it has for its objects to provide a simple and inexpensive construction of weeder in which provision is made to facilitate raising the rotary rod out of the ground when it is desired to clean the same or to transport the weeder from place to place.

In the accompanying drawings, I have illustrated the preferred embodiment of the invention and by reference thereto it will be seen that—

Figure 1 is a perspective view showing the invention in use, the parts being in the position they assume when the rod has been raised out of the ground.

Fig. 2 is a top plan view of the invention.

Fig. 3 is a side elevation of the same showing the position of the parts, in full lines, when in the operative position and in dotted lines when in a position with the rod raised out of the ground.

Fig. 4 is a detail view of a modification of the invention.

Fig. 5 is a diagrammatic elevation of the invention.

Fig. 6 is a diagrammatic elevation of a further modification of the invention.

In the drawings, in which like numerals and letters indicate like parts in all of the figures, those parts numbered up to 26 may be of the same construction and perform the same functions as the corresponding parts in the patent above referred to. Briefly stated, they comprise the transverse beam 1 which carries the pendent supports 2 for the rod bearings 4, in which bearings the rotary rod 5 is journaled. The rod 5 is driven through a suitable power transmission connection 12 from a traction wheel 19 which is carried by an extension frame 6. 23 indicates the draft beam which is connected by 26 to the supports 2 and has the fixtures 24 for the draft harness of the team. 20 designates the skids which are secured to the beam 1 and project downwardly a determined distance for the usual purposes.

The tiller frame, in the present invention, consists of a pair of bars 27 hinged at 29 to the beam 1 and braced together at 28 near the rear ends thereof. 22 is the caster wheel which is secured to the rear end of the tiller frame 27 for the usual purpose.

30 is a lever which is fastened at 31 to the beam 1 and is adapted at times to rest on the cross brace 28 while the parts are in the operative position (see Fig. 3). When it is desired to raise the rod out of the ground either for the purpose of cleaning the rod or for the purpose of transporting the machine from place to place the operator, standing on the tiller frame 27, raises the lever 30, as shown in Fig. 1, thereby bringing the skids 20 into contact with the ground. As the team pulls forwardly, when the parts are in this position, the rod 5 will be pulled up out of the ground, the points of contact of the skids 20 serving as the fulcrum (see Fig. 3).

If desired, in lieu of the skids 20, arms $20^a$ with wheels $20^b$ may be employed (see Fig. 4).

While I have shown the preferred embodiment of the invention, I also wish it understood that I do not desire in this application to be limited to the details of construction shown and described, as changes in the details of construction, arrangement and design of parts, may be readily made by those skilled in the art, without departing from the spirit of the invention or the scope of the appended claims.

In Fig. 5, I have shown diagrammatically a modification of the invention in which the skid arm $20^a$ is pivoted at $20^f$ and provided with a lever extension $20^c$ that coöperates with a rack $20^d$ and pawl $20^e$ whereby the wheels $20^b$ will be held up when the machine is in operation but by releasing the latch $20^e$, the operator may lift the lever $20^c$ and thereby raise the rotary rod out of the ground as shown in dotted lines in Fig. 5.

In Fig. 6, another modification of the invention is shown, in which two sets of skid arms 20ª are pivoted at 20ᶠ to the beam 1 and may be held up in the position shown in full lines by pins 20ᵍ that can be withdrawn when it is desired to swing the arms on their pivots. In this arrangement, the arms 20ª may be drawn together to the dotted line position by a block and tackle arrangement 20ʰ that can be operated, if desired, by connecting the tackle with a horse, or other power applying means, to bring the wheels 20ᵇ to the dotted line position shown in Fig. 6, and thereby raise the rotary rod out of the ground. It should be understood, of course, that Figs. 5 and 6 are mere diagrammatic indications of modifications of the invention and in practice the parts would be designed and proportioned in the most advantageous way to produce the results indicated.

From the foregoing description taken in connection with the accompanying drawings, it is believed that the complete construction, operation and advantages of this invention will be clear to those skilled in the art. I might mention, however, that with the present construction, it is not necessary to raise the entire tiller frame, as in the patent above referred to, and hence the effort employed by the operator to get the rotary rod out of the ground is reduced to the minimum and this is one of the chief commercial advantages of the present invention.

What I claim is:—

1. In rotary rod weeders, wherein is provided a transverse beam, pendent rod supports carried thereby, a rotatable rod mounted in bearings in said supports, means for driving said rod, draft applying means, skid arms secured to said beam, a tiller frame directly hinged to said transverse beam and supported thereby at its front end, and a lever secured to said transverse beam whereby an operator, standing on the tiller frame, can tilt said beam.

2. In rotary rod weeders, a transverse beam which carries the rotary rod and its driving mechanism, a tiller frame directly hinged to said beam and supported thereby at its front end, means for moving said beam on the hinge axis to tilt said beam, runner arms on the beam adapted when the beam is tilted to engage the ground and serve as a fulcrum to bring the rotary rod up out of the ground.

3. In rotary rod weeders, a transverse beam, rod supports carried thereby, a rotary rod journaled in bearings in said supports, means to rotate said rod, a draft appliance, arms or skids secured to said beam, a tiller frame hingedly and directly connected to said beam and supported thereby at its front end, a caster wheel carried by the tiller frame and a lever for rocking said beam to raise and lower the rod with respect to the ground.

4. In rotary rod weeders, a transverse beam, rod supports carried thereby, a rotary rod journaled in bearings in said supports, means to rotate said rod, a draft appliance, arms secured to said beam, a tiller frame hingedly connected to said beam, a caster wheel carried by the tiller frame and a lever for rocking said beam to raise and lower the rod with respect to the ground, said lever adapted to lie on said tiller frame when the weeder is in action.

5. In rotary rod weeders, the combination with the transverse beam which sustains the rotary rod bearings and the operating mechanism, of a tiller frame directly hinged to said beam and supported thereby at one end and means by which said beam may be rocked with respect to said tiller frame on the hinge axis.

6. In rotary rod weeders, the combination with the transverse beam which sustains the rod supports and the operating mechanism for the rod, of a tiller frame hinged to said beam and a lever secured to said beam and adapted to project over and lie adjacent to the tiller frame when the weeder is in operation, said lever being adapted to be raised above said tiller frame to tilt said beam with respect to the tiller frame to thereby cause an elevation of the rotary rod from the ground.

7. In rotary rod weeders, a transverse beam which carries the rotary rod and its driving mechanism, a tiller connected with said beam, and supported thereby at its front end, runners projected in advance of said beam and adapted to engage the ground and means coöperating with said runners for raising the rotary rod out of the ground while the tiller remains in contact with the ground.

8. In rotary rod weeders, a transverse beam which carries the rotary rod and its driving mechanism, a tiller directly connected with said beam and supported at one end thereby, means at the other end of said tiller frame for supporting the same at the ground, means connected to said beam and adapted to engage the ground and means coöperating with said last named means for raising the rotary rod out of the ground while the tiller remains in contact with the ground.

LOUIS C. VAN PATTEN.